United States Patent
Katagiri et al.

(10) Patent No.: US 7,326,933 B2
(45) Date of Patent: Feb. 5, 2008

(54) RADIATION OR NEUTRON DETECTOR USING FIBER OPTICS

(75) Inventors: Masaki Katagiri, Ibaraki-ken (JP); Masahito Matsubayashi, Ibaraki-ken (JP)

(73) Assignee: Japan Atomic Energy Research Institute, Kashiwa (JP)

( * ) Notice: Subject to any disclaimer, the term of this patent is extended or adjusted under 35 U.S.C. 154(b) by 4 days.

(21) Appl. No.: 11/640,238

(22) Filed: Dec. 18, 2006

(65) Prior Publication Data

US 2007/0278413 A1    Dec. 6, 2007

Related U.S. Application Data

(63) Continuation of application No. 10/927,059, filed on Aug. 27, 2004.

(30) Foreign Application Priority Data

Aug. 29, 2003  (JP)  .............. 2003/307586

(51) Int. Cl.
G01T 1/20   (2006.01)
G01T 1/00   (2006.01)
(52) U.S. Cl. .................... 250/368; 250/367; 250/486.1
(58) Field of Classification Search ................ 250/368, 250/367, 366, 362, 363.03, 390.11, 486.1; 385/12, 128; 362/551, 556
See application file for complete search history.

(56) References Cited

U.S. PATENT DOCUMENTS

| | | | |
|---|---|---|---|
| 5,391,878 A | 2/1995 | Petroff | |
| 5,600,144 A | 2/1997 | Worstell | |
| 5,714,761 A | 2/1998 | Fay | |
| 5,995,686 A | 11/1999 | Hamburger et al. | |
| 6,078,052 A | 6/2000 | DiFilippo | |
| 6,272,269 B1 | 8/2001 | Naum | |
| 6,546,174 B2 | 4/2003 | Clarkin | |
| 6,927,398 B2 | 8/2005 | Katagiri | |
| 7,095,029 B2 | 8/2006 | Katagiri | |

FOREIGN PATENT DOCUMENTS

| | | |
|---|---|---|
| JP | 2000-187077 | 7/2000 |
| JP | 2002-071816 | 3/2002 |

OTHER PUBLICATIONS

U.S. Appl. No. 10/927,059, filed Aug. 27, 2004, Masaki Katagiri et al., Japan Atomic Energy Research Institute.

*Primary Examiner*—David Porta
*Assistant Examiner*—Faye Boosalis

(57) ABSTRACT

A radiation or neutron detector wherein lateral side light detecting optical fibers prepared from clear optical fibers that are scraped on a lateral side to permit side incidence of fluorescence are used to detect the fluorescence from a phosphor or a scintillator such that the background to gamma-rays is reduced. If desired, the optical fibers may be bent at 90 degrees and guided to a photomultiplier tube in order to reduce the size of the detector. Fabrication and maintenance of the detector can be facilitated by adopting such a design that a detecting block comprising a detection medium and lateral side light detecting optical fibers is separated from a readout block comprising clear optical fibers.

3 Claims, 16 Drawing Sheets

RADIATION OR NEUTRON DETECTOR USING FIBER OPTICS

This application is a continuation of and claims priority to U.S. patent application Ser. No. 10/927,059, filed Aug. 27, 2004, and claims priority from the Japanese Patent Application 2003-307586 filed Aug. 29, 2003, the contents of which are incorporated by reference herein.

BACKGROUND OF THE INVENTION

This invention relates to a fiber optics based radiation or neutron detector in which the fluorescence emitted from a phosphor or scintillator is guided not direct through a wavelength shifting fiber but first allowed to be incident on a partially scraped lateral side of a clear optical fiber and then guided to both ends of a wavelength shifting fiber.

Conventional fiber optics based radiation and neutron detectors are a radiation image detector and a neutron image detector that use a phosphor or a scintillator in combination with a wavelength shifting fiber (Nucl. Instr. and Meth., A430 (1999) 311-320, Japanese Patent Application Hei 10-366679 and Japanese Patent Application 2000-259443). These detectors are characterized by using the crossed fiber readout method to obtain position information. As shown in FIG. 17, a phosphor sheet or a scintillator plate is sandwiched between wavelength shifting fiber bundles that are placed in crossed planes at right angles and the incident position of radiation is determined by a coincidence counting technique such as to detect a radiation image. Alternatively, as shown in FIG. 18, two bundles of wavelength shifting fibers, one for detecting shorter wavelengths of fluorescence and one for detecting longer wavelengths of fluorescence, are placed in crossed planes at right angles and are overlaid with a phosphor sheet or a scintillator plate and the incident position of radiation is determined by a coincidence counting technique such as to detect a radiation image.

The wavelength shifting fibers used in those detectors first absorb the fluorescence as emitted from the phosphor or scintillator, then convert the absorbed wavelength to a longer one for detecting the fluorescence. As a result of the conversion, the wavelength of the fluorescence becomes so long as to exceed the range of detection sensitivity of a photomultiplier tube commonly used as a photo detector. In particular, when the wavelength shifting fiber is used in a neutron detector, its sensitivity for gamma-rays has been the cause of gamma-ray background.

In order to increase the detection sensitivity of the above-described methods, a plurality of sensors each comprising a phosphor or scintillator and wavelength shifting fibers are placed one on another but then the number of wavelength shifting fibers is so much increased that the detecting configuration becomes complicated.

If wavelength shifting fibers or optical fibers are bent at the right angle or at an angle close to it, practical design considerations have made it unavoidable to bend the fiber with a radius of curvature no smaller than several centimeters. However, this has put a limit on the effort to fabricate a compact detector.

A further problem with the radiation image detector or neutron image detector that use a phosphor or a scintillator in combination with wavelength shifting fibers is that if the length of the wavelength shifting fibers is increased, the wavelength shifted fluorescence is absorbed as it is transmitted and a decreasing amount of the fluorescence will arrive at the detector. Hence, it has been impossible to use very long fibers. In addition, as already mentioned, the wavelength shifting fibers themselves have sensitivity for gamma-rays, so if they are incorporated in a neutron detector, the gamma-ray background is a problem and if they are used in a gamma-ray detector, there is produced a background to the desired gamma-ray image. In order to avoid these problems, it has been necessary to minimize the length of the wavelength shifting fibers.

SUMMARY OF THE INVENTION

In the present invention, the fluorescence emitted from a phosphor or a scintillator is guided not direct through a wavelength shifting fiber but first allowed to be incident on a partially scraped lateral side of a clear optical fiber and then guided to both ends of a wavelength shifting fiber, thereby detecting radiation or neutron. Alternatively, in the case of detecting a radiation image or a neutron image, at least one of the two wavelength shifting fiber bundles crossed at right angles is replaced by the above-described clear optical fibers having a partially scraped lateral side in order to reduce the gamma-ray background.

In order to increase the detection sensitivity of the radiation image detector or neutron image detector, sensors are not simply stacked but the two perpendicular wavelength shifting fiber bundles are designed to have the same sensitivity such that fluorescence can be detected from both top and bottom surfaces as they are sandwiched between phosphors or scintillators.

As regards the bending of optical fibers which is essential for the purpose of making a compact detector, it was found that with a fiber size of no larger than 1 mm (either as the diameter of a circular fiber or as the length of each lateral side of a square fiber), a suitably chosen fiber material permitted about 20-50% transmission of fluorescence even when the fiber was bent at the right angle or at an angle close to it. On the basis of this finding, optical fibers are used as bent in the present invention.

If the length of the wavelength shifting fiber is increased, the gamma-ray background is also increased. To avoid this problem, a clear optical fiber is substituted for part of detection path. In this case, the clear optical fiber is designed to have a larger diameter than the wavelength shifting fiber and the two fibers are connected by means of grease.

EXAMPLES

Example 1

Figure 1:
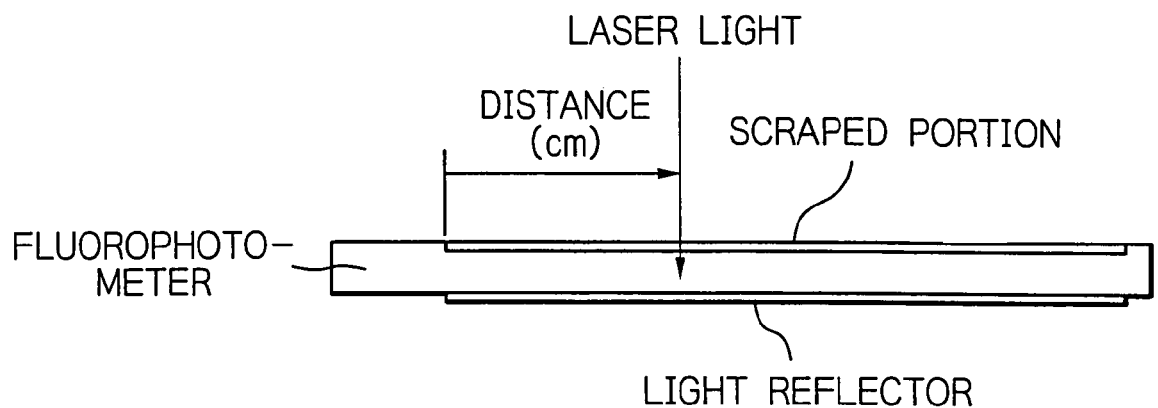
FIG. 1 shows schematically a side-incidence optical fiber which has a lateral side scraped partially and fitted on the opposite side with a sheet of white paper as a light reflector.
Figure 2:
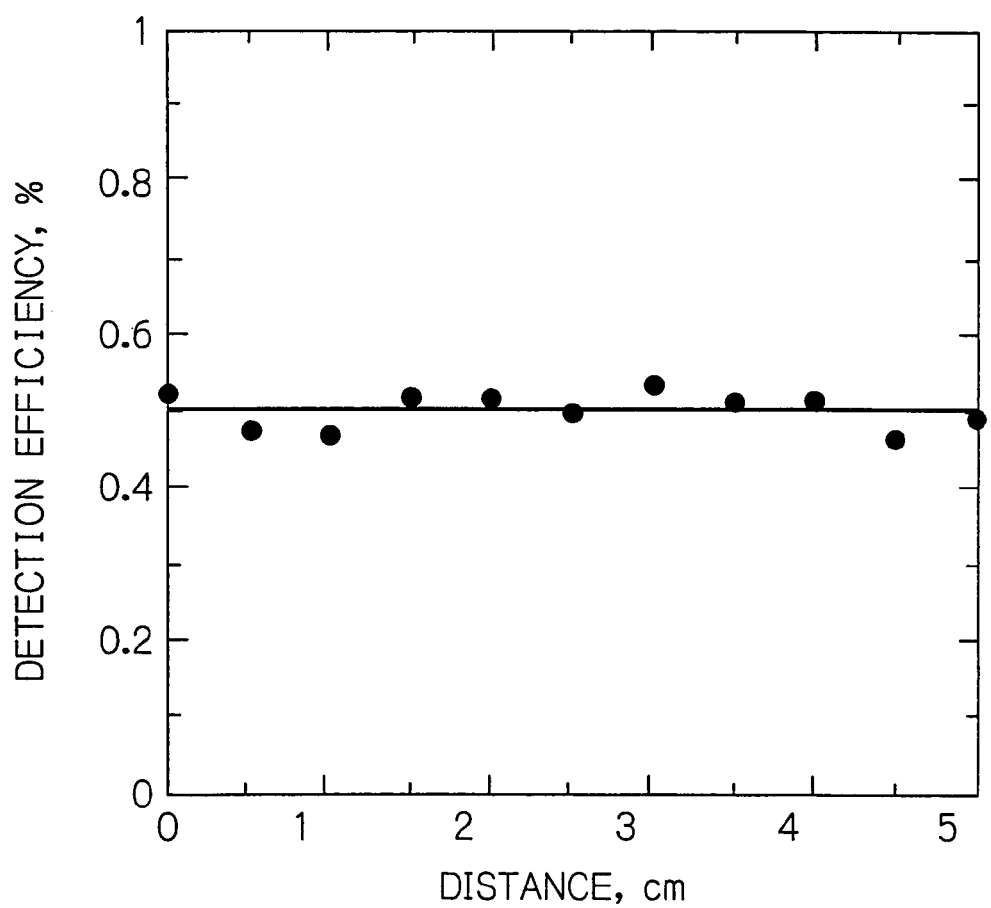
FIG. 2 is a graph showing the position profile characteristics of the light detection efficiency of a lateral side light detecting optical fiber having a 5-cm long detecting portion.

A clear optical fiber BCF-98 (Bicron Co.) having a square cross section 0.5 mm long on each side had one of the four lateral sides scraped off by a depth of 20 μm over a length of 5 cm and a sheet of white paper was attached to the opposite side as a light reflector. For schematic representation of this optical fiber, see FIG. 1. The position profile characteristics of the fluorescence as emitted from the resulting lateral side light detecting optical fiber were measured with a modified fluorophotometer. As shown in FIG. 2, a substantially uniform profile was obtained for the entire 5-cm range. The detection efficiency as calibrated with a 678 nm laser light source was about 0.5%.

Figure 3:
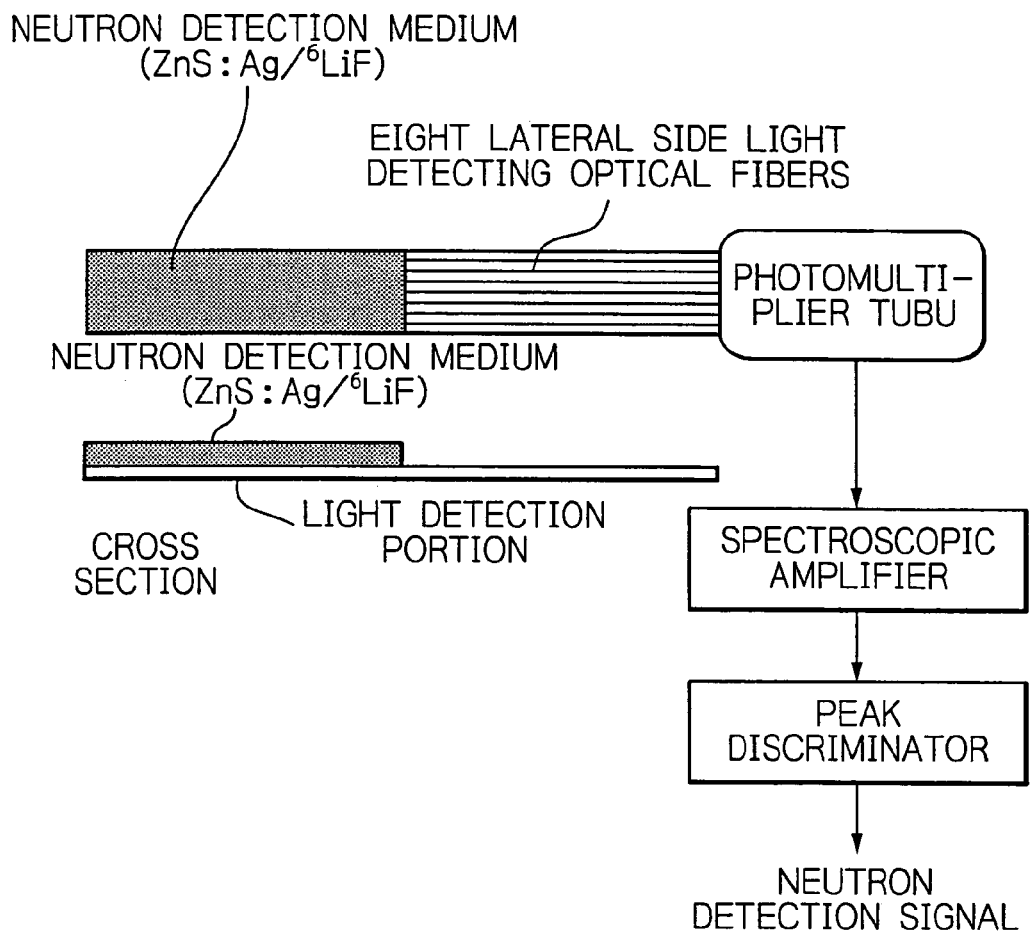
FIG. 3 shows schematically a neutron detector which uses lateral side light detecting optical fibers to detect the fluorescence as emitted from a neutron detection sheet, thereby detecting neutron.

In Example 1, eight lateral side light detecting optical fibers of the type described above were bundled and connected to a neutron detection sheet comprising a mixture of a phosphor and a neutron converter. The thus assembled neutron detector is shown schematically in FIG. 3. The neutron detection sheet was BC-702 (Bicron Co.) which had a mixture of ZnS:Ag (phosphor) and $^6$LiF (neutron converter) applied to an aluminum plate 1 mm thick. The neutron detector thus fabricated had a detecting portion 4 mm wide and 4 cm long. The optical fibers were each 1 mm long and connected at the other end to a photomultiplier tube which was R647P of HAMAMATSU PHOTONICS K.K. Since the fluorescence life of ZnS:Ag was 200 ns, the output signal from the photomultiplier tube was amplified for waveform shaping by a spectroscopic amplifier that had been set to a waveform shaping time constant of 0.5 μs. The amplified signal was then passed through a waveform discriminator to pick up pulse signals greater than a specified signal level, thereby producing neutron signals.

Example 2

In Example 2, the side of a clear optical fiber which was opposite the scraped side was fitted with a sheet of white paper, a TEFLON™ (registered trademark) plate, or coated with white paint, or fitted with aluminum foil or polystyrene plate, and detection efficiency measurement was made at a point 2 cm away from the fiber end. The results are shown in Table 1. For comparison, the results with a black plate and an aluminum plate are also shown. According to the invention, the light detection efficiency was in the range of 0.4% to 0.5% upon incidence on the scraped side; on the other hand, when the black and aluminum plates making no random reflection were used, the detection efficiency was 0.04% and 0.2%, respectively, which were almost less than half the values for the present invention. Example 2 of the invention is obviously effective.

TABLE 1

| Material | Incidence on scraped side (%) | Incidence on back side (%) |
| --- | --- | --- |
| Black plate | 0.04 | 0.04 |
| Aluminum plate | 0.20 | 0.09 |
| Aluminum foil (with gloss) | 0.26 | 0.10 |
| Aluminum foil (matted) | 0.42 | 0.19 |
| White aqueous paint | 0.42 | 0.21 |
| White paper | 0.52 | 0.31 |
| Polystyrene plate | 0.52 | 0.29 |
| TEFLON ™ plate | 0.53 | 0.27 |
| White phosphor powder | 0.55 | 0.33 |

Example 3

Figure 4:
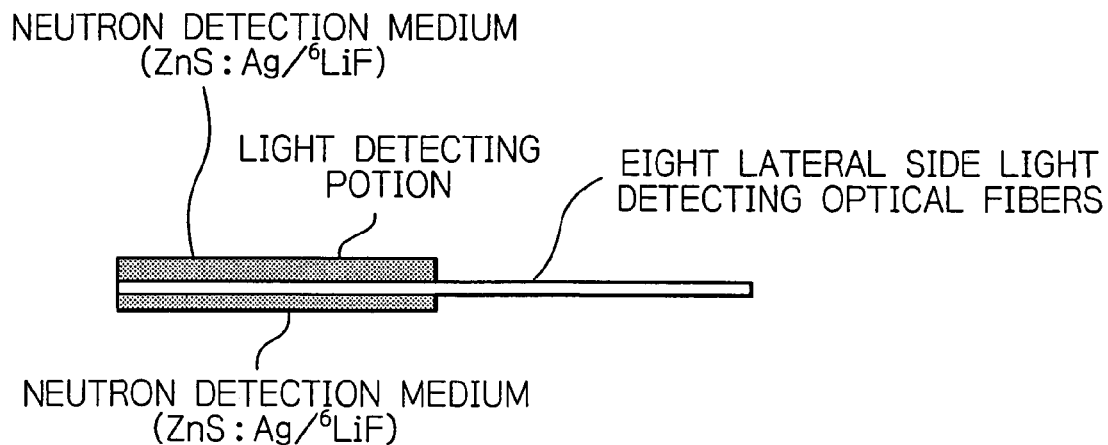
FIG. 4 shows schematically a neutron detector which has a phosphor placed on both a scraped side of an optical fiber and the opposite side.

In Example 3, the side of a clear optical fiber which was opposite the scraped side was fitted with a white phosphor powder as a random reflector. The neutron detector of Example 3 is shown schematically in FIG. 4, from which one can see that a phosphor was placed on both the scraped side and the backside. As Table 1 shows, the light detection efficiency with the phosphor was 0.55% for the incidence on the scraped side and 0.33% for the incidence on the backside. When a neutron detection medium (0.4 mm thick) comprising a mixture of ZnS:Ag and the neutron converter $^6$LiF is used as the phosphor, more than 1500 photons are emitted upon incidence of a neutron. Even if the detection efficiency is 0.33%, five photons are transmitted to the photo detector. When a photomultiplier tube having a quantum efficiency of about 20% is used as the photo detector, a photon provides one electrical signal and neutrons can be reasonably detected by a photon counting technique. Being opaque, the detection medium cannot be made thicker than 0.5 mm. However, according to Example 3, the thickness of the detection medium is doubled to enable the fabrication of a neutron detector that is substantially 0.8 mm thick and whose detection efficiency is almost doubled.

Example 4

Figure 5:
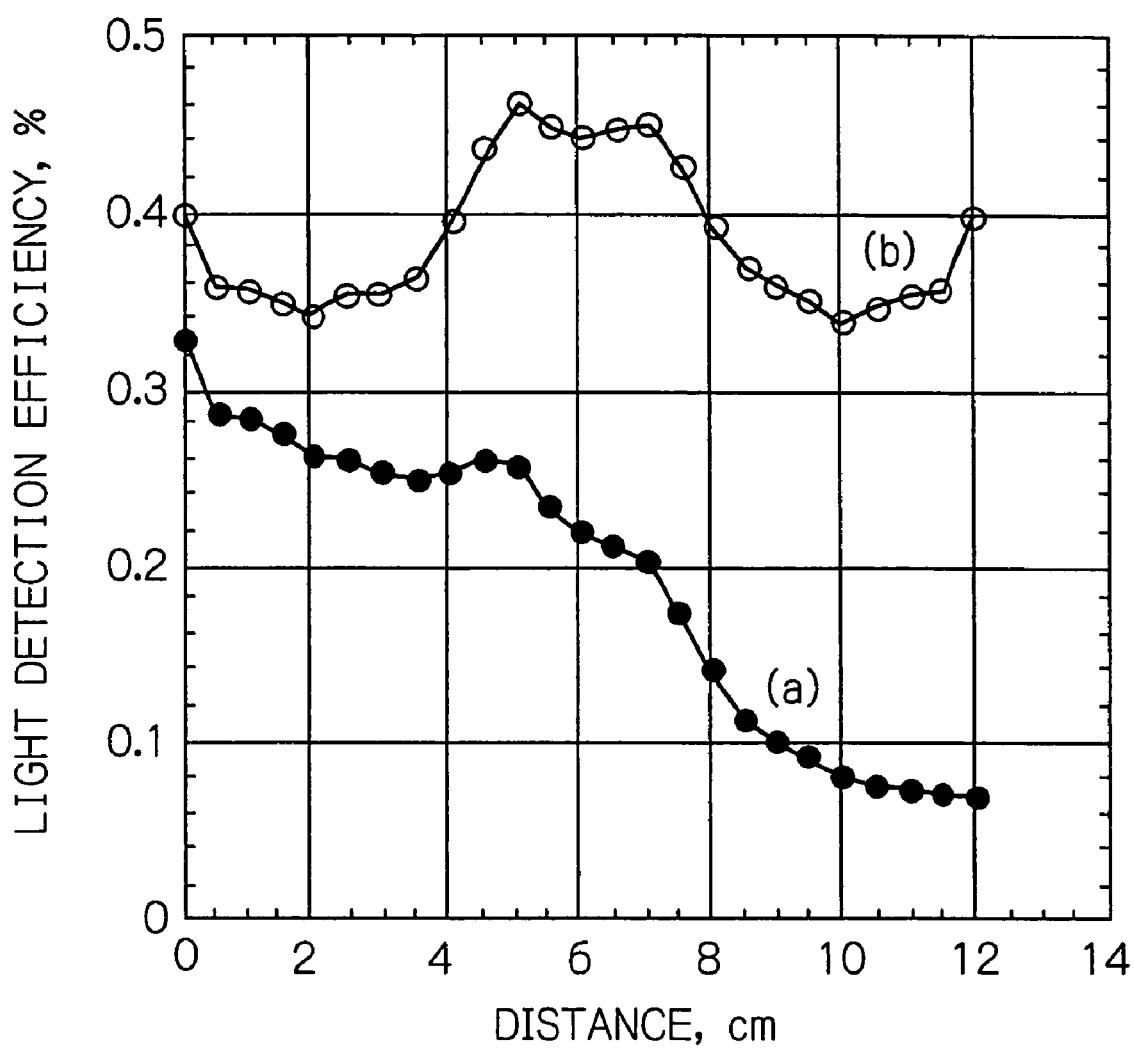
FIG. 5 is a graph showing the position profile characteristics of the light detection efficiency of a lateral side light detecting optical fiber having a 12-cm long detecting portion.

A clear optical fiber BCF-98 (Bicron Co.) having a square cross section 0.5 mm long on each side had one of the four lateral sides scraped off by a depth of 30 μm over a length of 12 cm and white paint was applied to the opposite side as a light reflector. The position profile characteristics of the fluorescence emitted from the resulting side-incidence optical fiber were measured with a modified fluorophotometer. As shown by curve (a) in FIG. 5, a profile was obtained that had a good fit to an exponential function. This is because when a side of the optical fiber was scraped off over a length of 12 cm, the detection efficiency was high in the area that was first scraped off but decreased toward the other end. To deal with this situation, light detection is performed from both ends of the optical fiber and this provides an incident position profile characteristic indicated by curve (b) in FIG. 5. As a result, it was verified that the lateral side light detecting optical fiber of Example 4 could be used as a type of which the light detection efficiency was practically independent of incident position over a wide range.

Example 5

Figure 6:
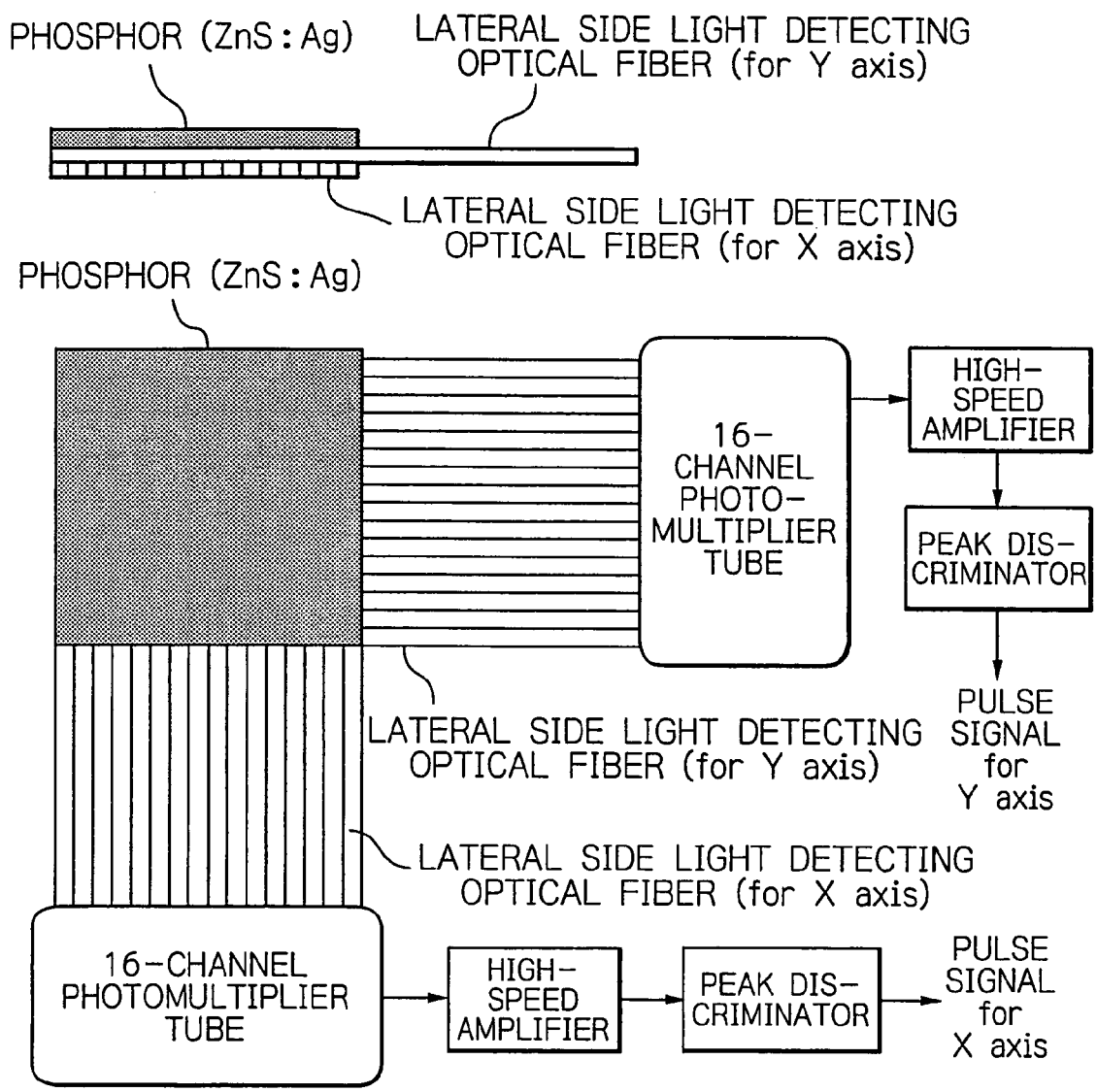
FIG. 6 shows schematically a two-dimensional radiation image detector which has two bundles of parallel arranged lateral side light detecting optical fibers that are crossed at right angles.

A two-dimensional radiation image detector according to Example 5 of the invention is shown schematically in FIG. 6. The radiation to be detected in Example 5 was alpha particles and ZnS:Ag, a common phosphor as a medium for detecting alpha particles, was employed. A phosphor sheet formed of ZnS:Ag in a thickness of 0.2 mm was underlaid with two bundles of parallel arranged lateral side light detecting optical fibers that were crossed at right angles as shown in FIG. 6; each fiber bundle consisted of clear optical fibers each having one of the four lateral sides scraped off to provide a detecting portion.

ZnS:Ag emits fluorescence over a broad wavelength range of from 360 nm to 540 nm, with the center at 450 nm, and the fluorescence life is 200 ns.

The lateral side light detecting optical fibers were prepared from BCF-98, a clear fiber of Bicron Co. This fiber having a square cross section 0.5 mm long on each side was chosen since the phosphor sheet was 0.2 mm thick. The clear fibers in the two perpendicular optical fiber bundles were individually connected to the photo detector.

The fluorescence emitted from the lateral side light detecting optical fibers prepared from BCF-98 was detected using H6568 (a 16-channel photomultiplier tube of HAMAMATSU PHOTONICS K.K.) as a photo detector. The opto-electric signals outputted from the photomultiplier tube were amplified with an amplifier and individually converted to digital pulse signals by means of a peak discriminator, producing pulse signals for X- and Y-axes. By coincidence counting of those pulse signals for X- and Y-axes, the two-dimensional incident position of radiation is determined. If the coincidence counting time is 600 ns which is three times the life of the fluorescence from ZnS:Ag, reliable coincidence counting can be effected to detect a radiation image.

Example 6

Figure 7:
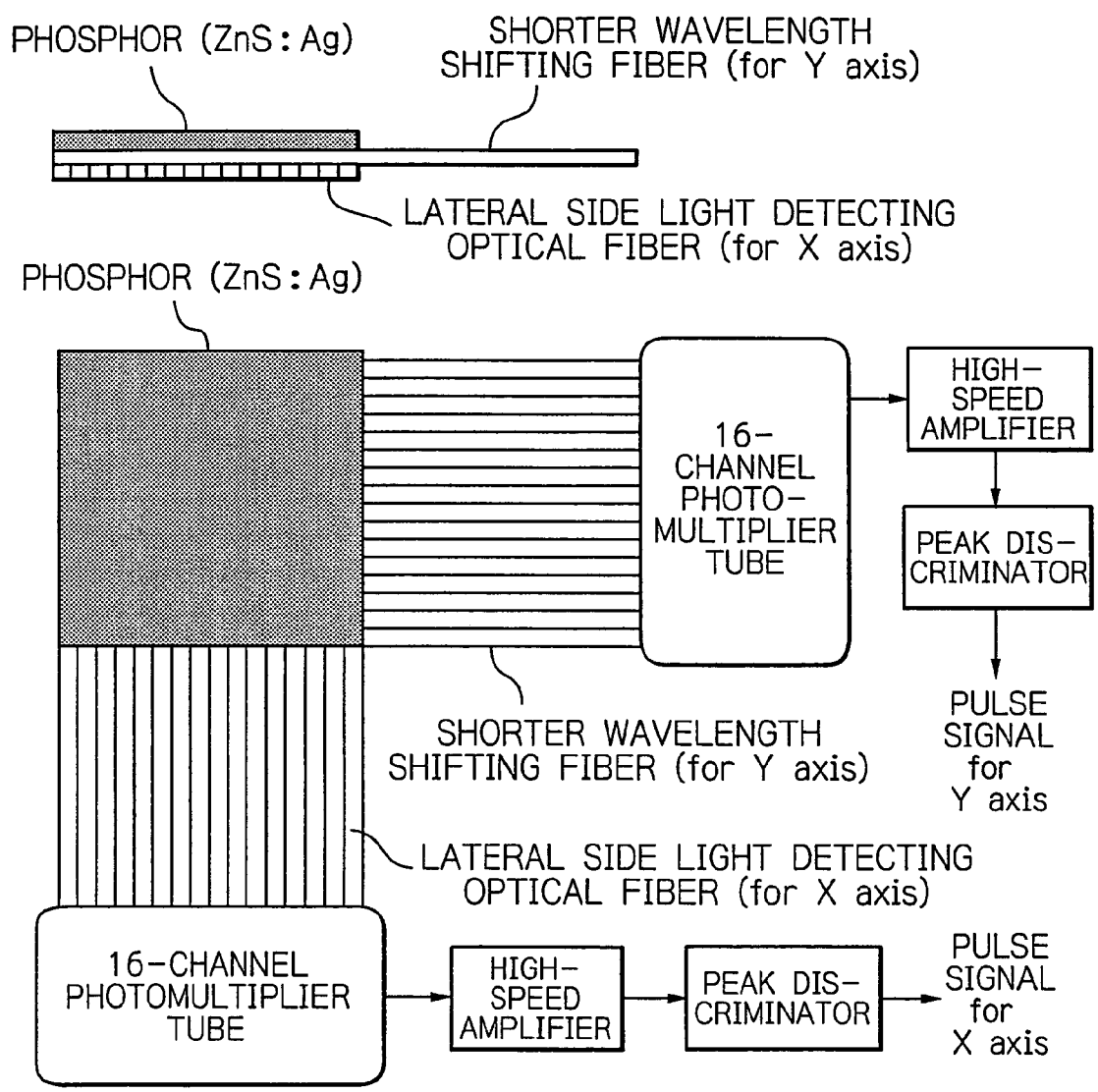
FIG. 7 shows schematically a two-dimensional radiation image detector which uses shorter wavelength shifting fibers and lateral side light detecting optical fibers.

A two-dimensional radiation image detector according to Example 6 of the invention is shown schematically in FIG. 7. The radiation to be detected in Example 6 was alpha particles and ZnS:Ag, a common phosphor as a medium for detecting alpha particles, was employed. A phosphor sheet formed of ZnS:Ag in a thickness of 0.2 mm was underlaid with two parallel arrays of fibers that were crossed at right angles as shown in FIG. 7; one fiber array consisted of shorter wavelength shifting fibers having sensitivity to shorter wavelengths of the fluorescence emitted from the detection medium and the other fiber array consisted of clear optical fibers each having one of the four lateral sides scraped off to provide a detecting portion.

ZnS:Ag emits fluorescence over a broad wavelength range of from 360 nm to 540 nm, with the center at 450 nm, and the fluorescence life is 200 ns.

The shorter wavelength shifting fibers were BCF-92 of Bicron Co., Ltd. which had sensitivity to fluorescence at wavelengths ranging from 350 nm to 440 nm and which was capable of wavelength conversion to fluorescence at 490 nm. The lateral side light detecting optical fibers were prepared from BCF-98, a clear fiber of Bicron Co. This fiber having a square cross section 0.5 mm long on each side was chosen since the phosphor sheet was 0.2 mm thick. The parallel arranged wavelength shifting fibers and clear fibers were individually connected to the photo detector.

The system configuration and operation were the same as in Example 5 concerning the photo detector and subsequent components.

Example 7

Figure 8:
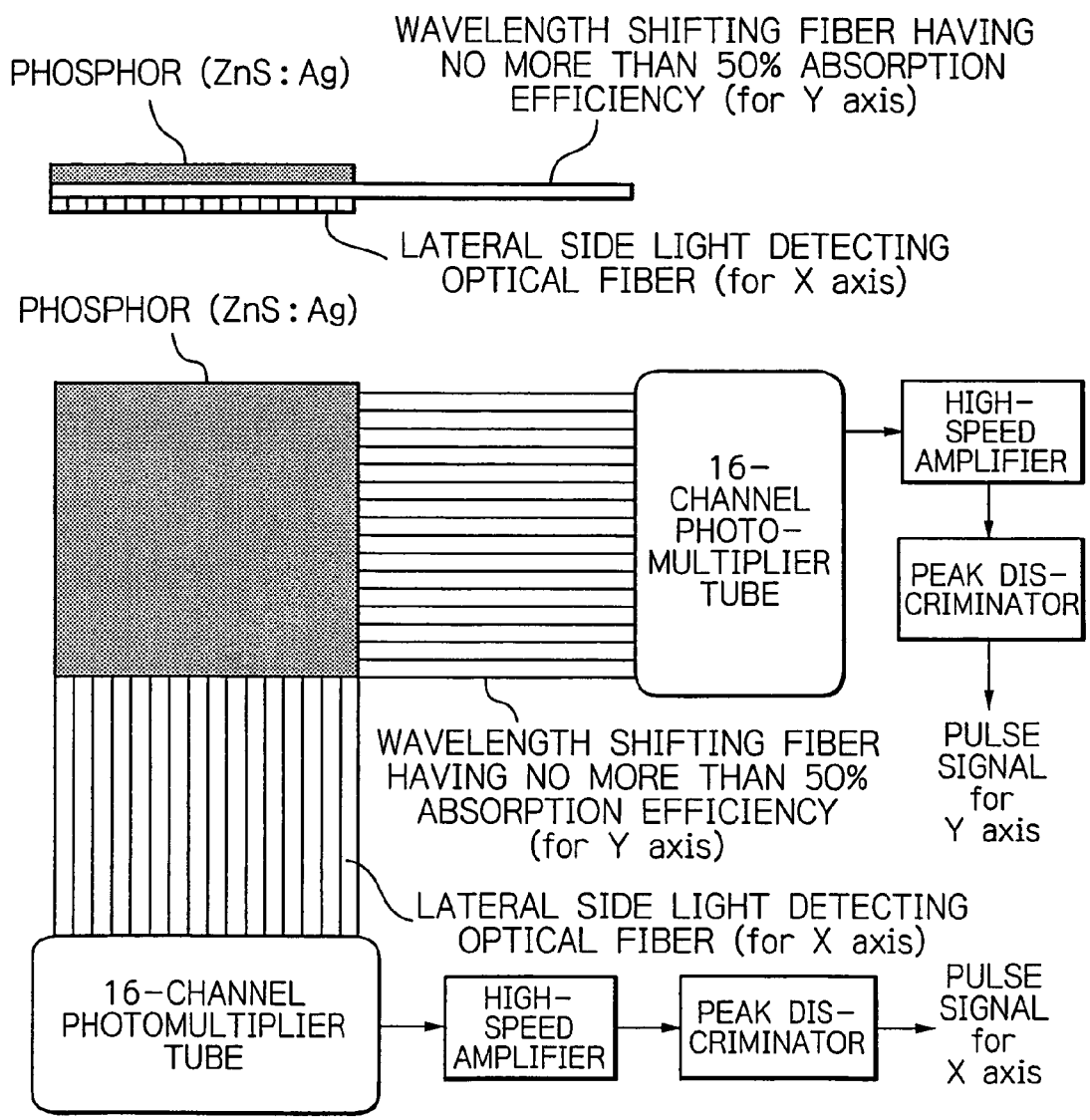
FIG. 8 shows schematically a two-dimensional radiation image detector which uses wavelength shifting fibers having an absorption efficiency of no higher than 50% and lateral side light detecting optical fibers.

A two-dimensional radiation image detector according to Example 7 of the invention is shown schematically in FIG. 8. The radiation to be detected in Example 7 was alpha particles and ZnS:Ag, a common phosphor as a medium for detecting alpha particles, was employed. A phosphor sheet formed of ZnS:Ag in a thickness of 0.2 mm was underlaid with two parallel arrays of fibers that were crossed at right angles as shown in FIG. 8; one fiber array consisted of wavelength shifting fibers that were sensitive to the fluorescence emitted from the detection medium and which had a fluorescence absorption efficiency of no more than 50% and the other fiber array consisted of clear optical fibers each having one of the four lateral sides scraped off to provide a detecting portion.

ZnS:Ag emits fluorescence over a broad wavelength range of from 360 nm to 540 nm, with the center at 450 nm, and the fluorescence life is 200 ns.

The wavelength shifting fibers that were sensitive to the fluorescence emitted from the detection medium and which had a fluorescence absorption efficiency of no more than 50% were Y-8 (Kuraray Co.; containing an organic phosphor at 100 ppm) which had sensitivity to fluorescence at wavelengths ranging from 390 nm to 500 nm and which was capable of wavelength conversion to fluorescence at 520 nm. The lateral side light detecting optical fibers were prepared from BCF-98, a clear fiber of Bicron Co. This fiber having a square cross section 0.5 mm long on each side was chosen since the phosphor sheet was 0.2 mm thick. The parallel arranged wavelength shifting fibers and clear fibers were individually connected to the photo detector.

The system configuration and operation were the same as in Example 5 concerning the photo detector and subsequent components.

Example 8

Figure 9:
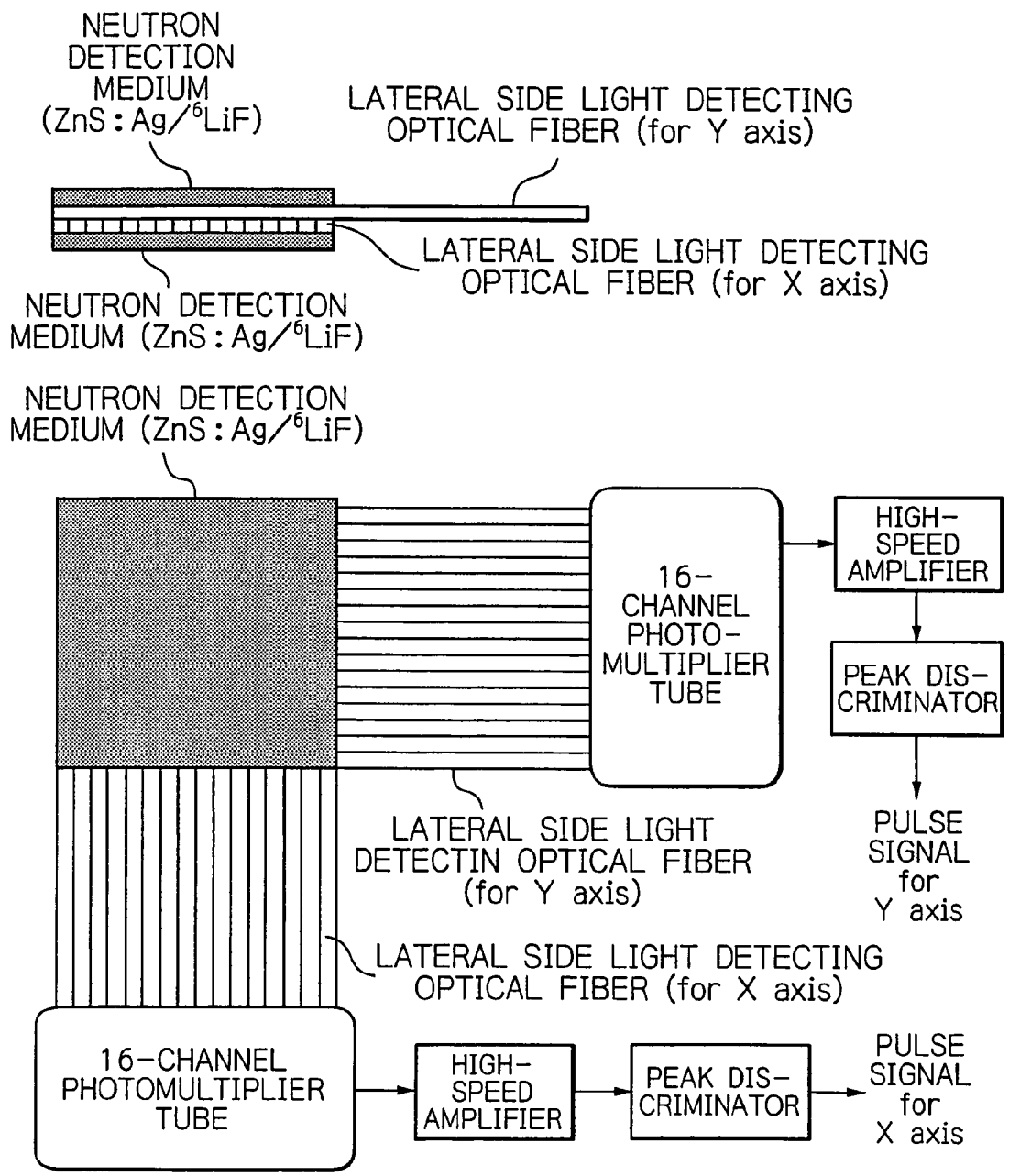
FIG. 9 shows schematically a two-dimensional neutron image detector which has two bundles of parallel arranged lateral side light detecting optical fibers that are crossed at right angles and sandwiched between neutron detection mediums.

The device that was constructed in Example 8 on the basis of Example 5 is described with reference to FIG. 9.

In Example 8, neutrons were to be detected. The neutron detection medium was 0.4-mm thick BC-702 (Bicron Co.) comprising ZnS:Ag as a phosphor and $^6$LiF as a neutron converter. Two units of such neutron detection medium were provided such that they sandwiched two bundles of parallel arranged lateral side light detecting fibers that were crossed at right angles; each bundle consisted of clear optical fibers that each had one of the four lateral sides scrapped off to provide a detecting portion. According to Example 8, the thickness of the neutron detection medium is doubled to enable the fabrication of a neutron image detector that is substantially 0.8 mm thick and whose detection efficiency is almost doubled.

In order to implement the concept of Example 8, it is essential that not only the scraped side of the lateral side light detecting optical fiber but also the backside which is opposite the scraped side should provide adequate efficiency of light detection. In the case of the lateral side light detecting optical fiber that was prepared in Example 3 by scraping off one of the four lateral sides, an adequately high (0.3%) efficiency of light detection was obtained when light was incident on the backside at a point 2 cm distant from the fiber end. In the case where two lateral side light detecting optical fiber bundles were placed one on the other, the efficiencies of light detection upon incidence on the scraped side or the backside of the underlying optical fiber had a tendency to increase slightly compared with the case of direct incidence. The reason for the slight increase in the efficiency would be the scattering of light from the overlying lateral side light detecting optical fiber. Thus, it became clear that double side detection of light was possible by a detector in which two lateral side light detecting optical fiber bundles were placed one on the other.

TABLE 2

| Material | Incidence on scraped side (%) | Incidence on back side (%) |
| --- | --- | --- |
| Black plate | 0.08 | 0.07 |
| Aluminum plate | 0.21 | 0.10 |
| Aluminum foil (with gloss) | 0.27 | 0.11 |
| Aluminum foil (matted) | 0.42 | 0.19 |
| White aqueous paint | 0.43 | 0.22 |
| White paper | 0.55 | 0.33 |
| Polystyrene plate | 0.52 | 0.30 |
| TEFLON ™ plate | 0.53 | 0.28 |
| White phosphor powder | 0.57 | 0.35 |

Example 9

Figure 10:
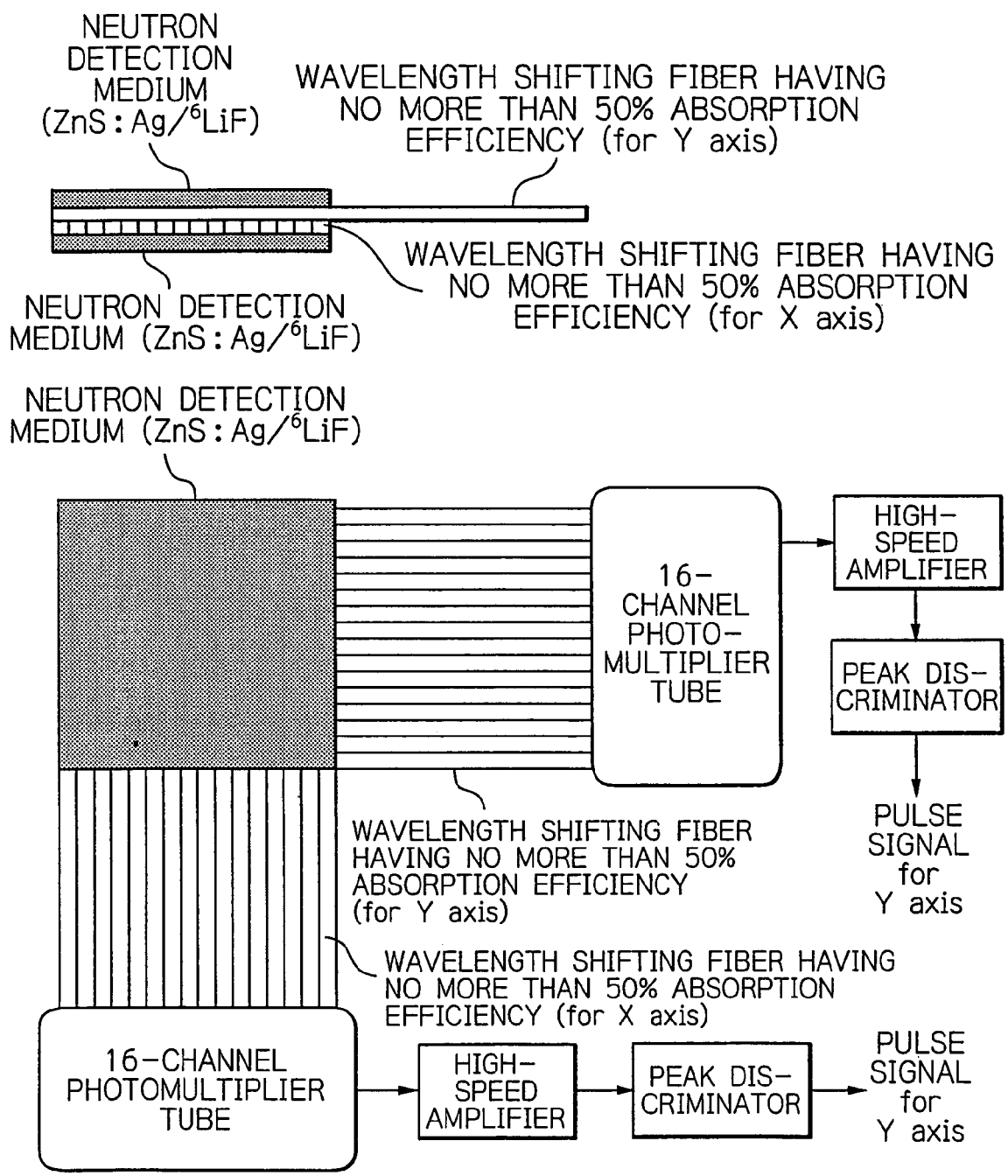
FIG. 10 shows schematically a two-dimensional neutron image detector in which two bundles of parallel arranged wavelength shifting fibers having a fluorescence absorption efficiency of no more than 50% are crossed at right angles and sandwiched between neutron detection mediums.

A neutron image detector according to Example 9 of the invention is shown schematically in FIG. 10.

Figure 11:
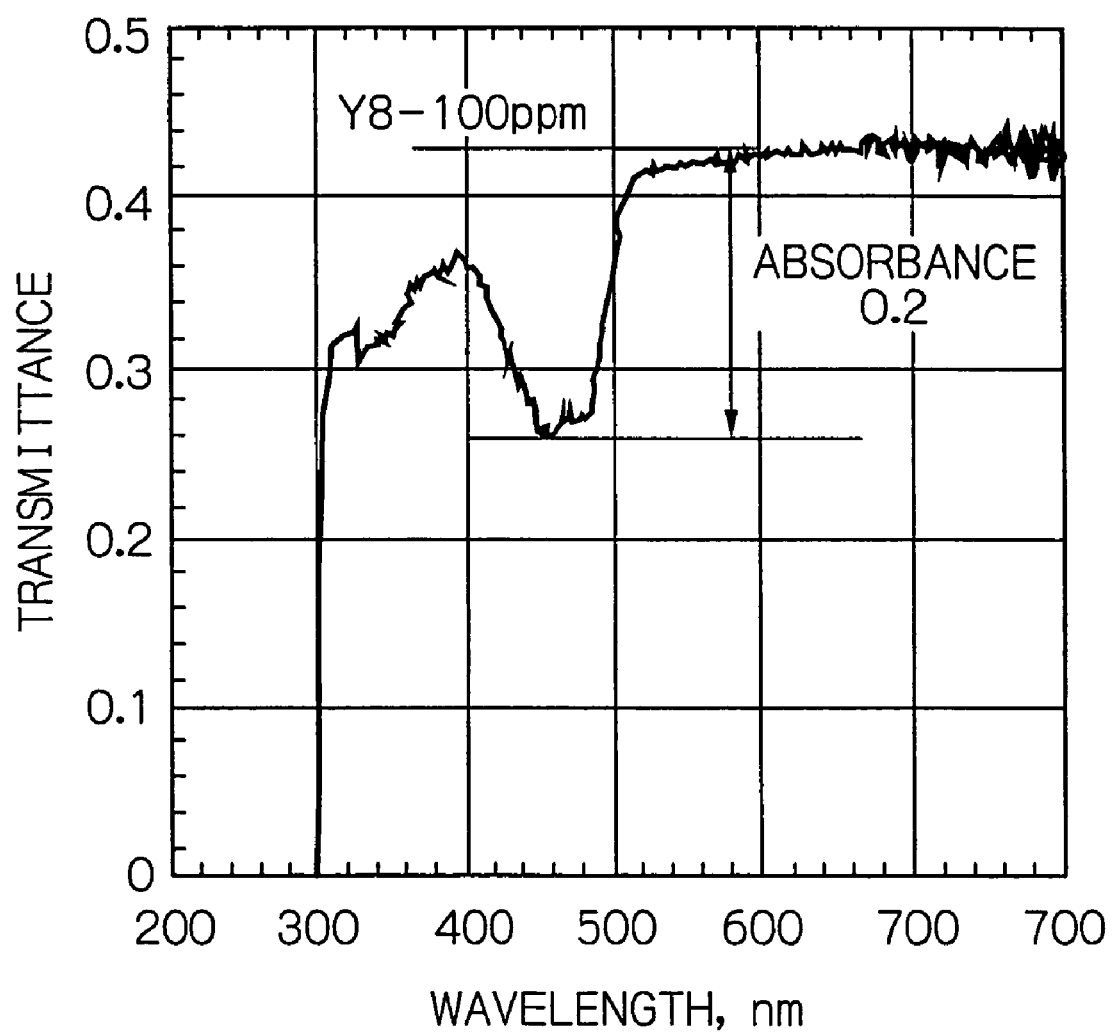
FIG. 11 is a graph showing the absorption characteristics of Y-8 of Kuraray Co. (containing 100 ppm of an organic phosphor)

In Example 9, neutrons were to be detected. The neutron detection medium was 0.4-mm thick BC-702 (Bicron Co.) comprising ZnS:Ag as a phosphor and $^6$LiF as a neutron converter. Two units of such neutron detection medium were provided such that they sandwiched two bundles of parallel arranged wavelength shifting fibers that were sensitive to fluorescence emitted from the detection mediums and which had a fluorescence absorption efficiency of no more than 50%. The wavelength shifting fibers that were sensitive to the fluorescence emitted from the detection mediums and which had a fluorescence absorption efficiency of no more than 50% were Y-8 (Kuraray Co.; containing an organic phosphor at 100 ppm) which had sensitivity to fluorescence at wavelengths ranging from 390 nm to 500 nm and which was capable of wavelength conversion to fluorescence at 520 nm. The absorption characteristics of such wavelength shifting fiber are shown in FIG. 11, from which one can see that the transmittance was less than 50% at all wavelengths tested. According to the design of Example 9, optical readout can be performed from both sides of the assembly of two wavelength shifting fiber bundles, so the thickness of the neutron detection medium is doubled to enable the fabrication of a neutron image detector that is substantially 0.8 mm thick and whose detection efficiency is almost doubled.

Example 10

Figure 12:
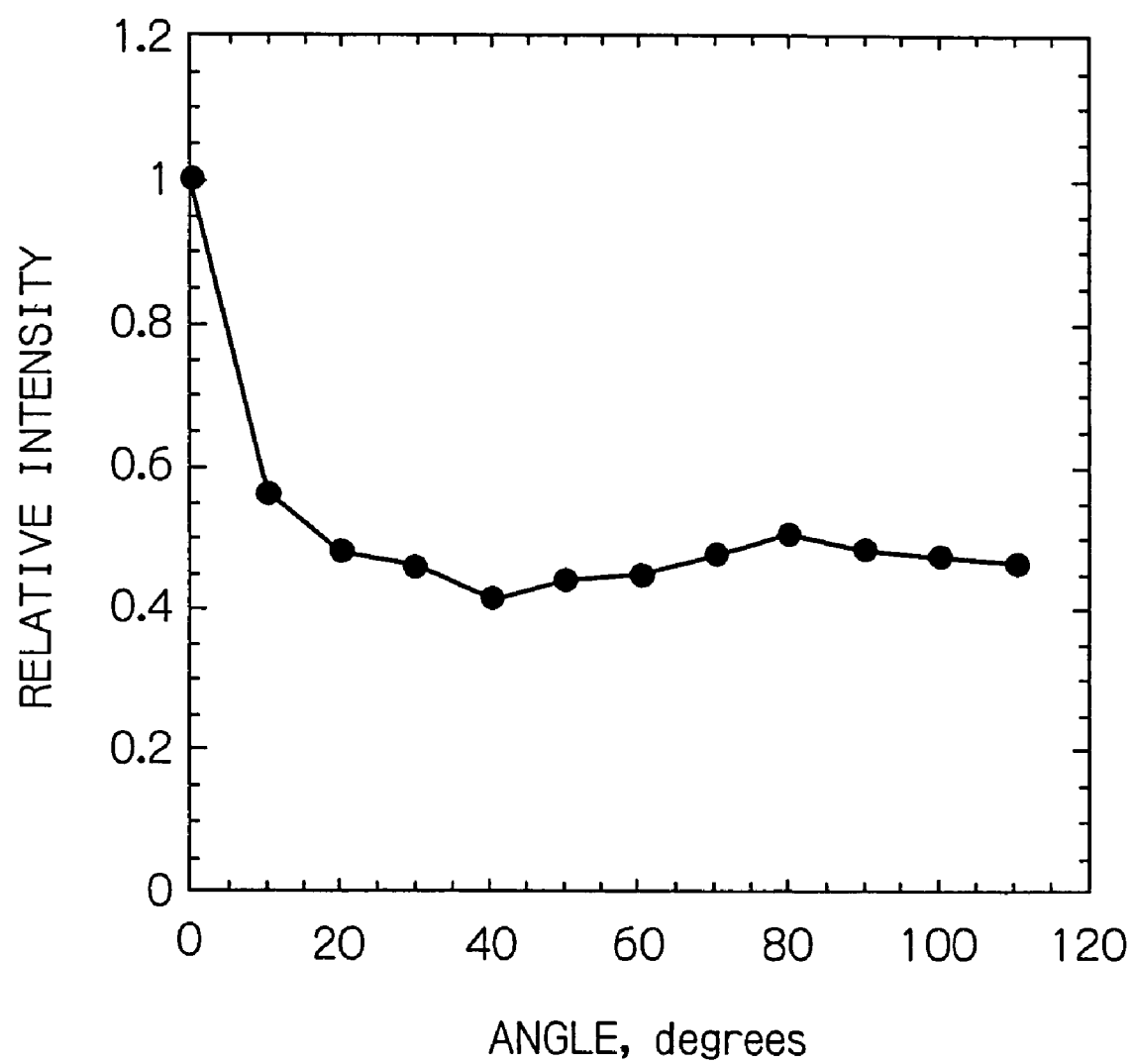
FIG. 12 is a graph showing the transmission characteristics of light traveling through an optical fiber bent through angles of 0-110 degrees.

When bending optical fibers including wavelength shifting fibers, a minimum radius of curvature that is required is at least 10 mm even in the case of a 0.5 mm$^\Phi$ optical fiber. However, when an optical fiber is to be used in combination with a phosphor or a scintillator, the curvature radius of the fiber contributes to a dead space and needs to be reduced. Optical fibers the core of which was formed of polystyrene or poly(methyl methacrylate) resin, varying in size from 0.25 to 1 mm (as the diameter of a circular fiber, or as the length of each side of a square fiber), were bent through angles of 45 to 105 degrees with the radius of curvature ranging from 1 to 1.5 times the diameter or the length of each side, and the light transmission characteristics of the bent fibers were measured. The optical fibers under test were BCF-98, the clear square fiber of Bicron Co. having a length of 0.5 mm on each side. The results are shown in FIG. 12, from which one can see that an optical fiber made of a properly chosen material had a transmittance of almost 50% even when it was bent with an angle of 90 degrees.

Figure 13:
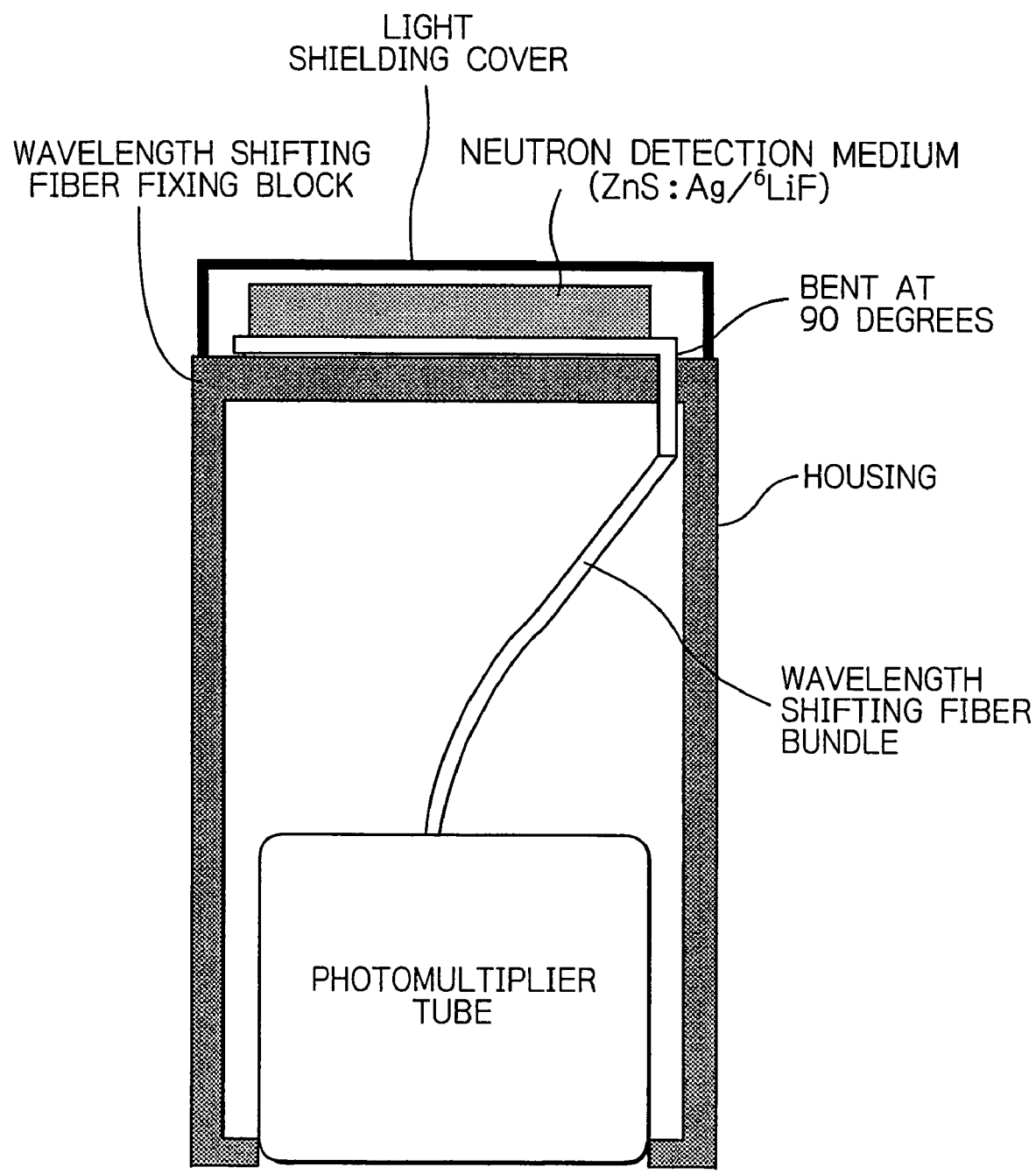
FIG. 13 shows schematically a neutron detector that uses wavelength shifting fibers as bent at 90 degrees.

On the basis of those results, a neutron detector was constructed according to the design shown in FIG. 13.

In Example 10, neutrons were to be detected. The neutron detection medium was 0.4-mm thick BC-702 (Bicron Co.) comprising ZnS:Ag as a phosphor and $^6$LiF as a neutron converter. The area of the neutron detection medium was 1 cm$^2$. This neutron detection medium was underlaid with wavelength shifting fibers that were bent with an angle of 90 degrees as shown in FIG. 13. The wavelength shifting fibers were BCF-92 (Bicron Co.) which had sensitivity to fluorescence at wavelengths ranging from 350 nm to 440 nm and which were capable of wavelength conversion to fluorescence at 490 nm. They were square optical fibers having a length of 0.5 mm on each side and bent as shown in FIG. 13 such that the other end was connected to a photomultiplier tube. In order to provide a detecting portion whose area was 10 mm square, 20 of such wavelength shifting fibers were employed. The photomultiplier tube was R647P (HAMAMATSU PHOTONICS K.K.) having a diameter of 1.3 cm. By adopting this design, one can fabricate a small neutron detector having no dead space.

If the core of the optical fibers is made of polystyrene, it is essential that the polystyrene molecules be joined consecutively in order to provide sufficient bending strength. This material is used in the wavelength shifting fiber and clear fiber of Bicron Co. In the product of Kuraray Co., S-type polystyrene molecules are joined consecutively.

It should be noted that the wavelength shifting fibers used in Example 10 may be replaced by clear optical fibers which, as already mentioned in Example 1, had one of the four lateral sides scraped off by a depth of 20 μm over a length of 1 cm, with a sheet of white paper being attached to the opposite side as a light reflector, in order to permit side incidence of light.

Example 11

Figure 14:
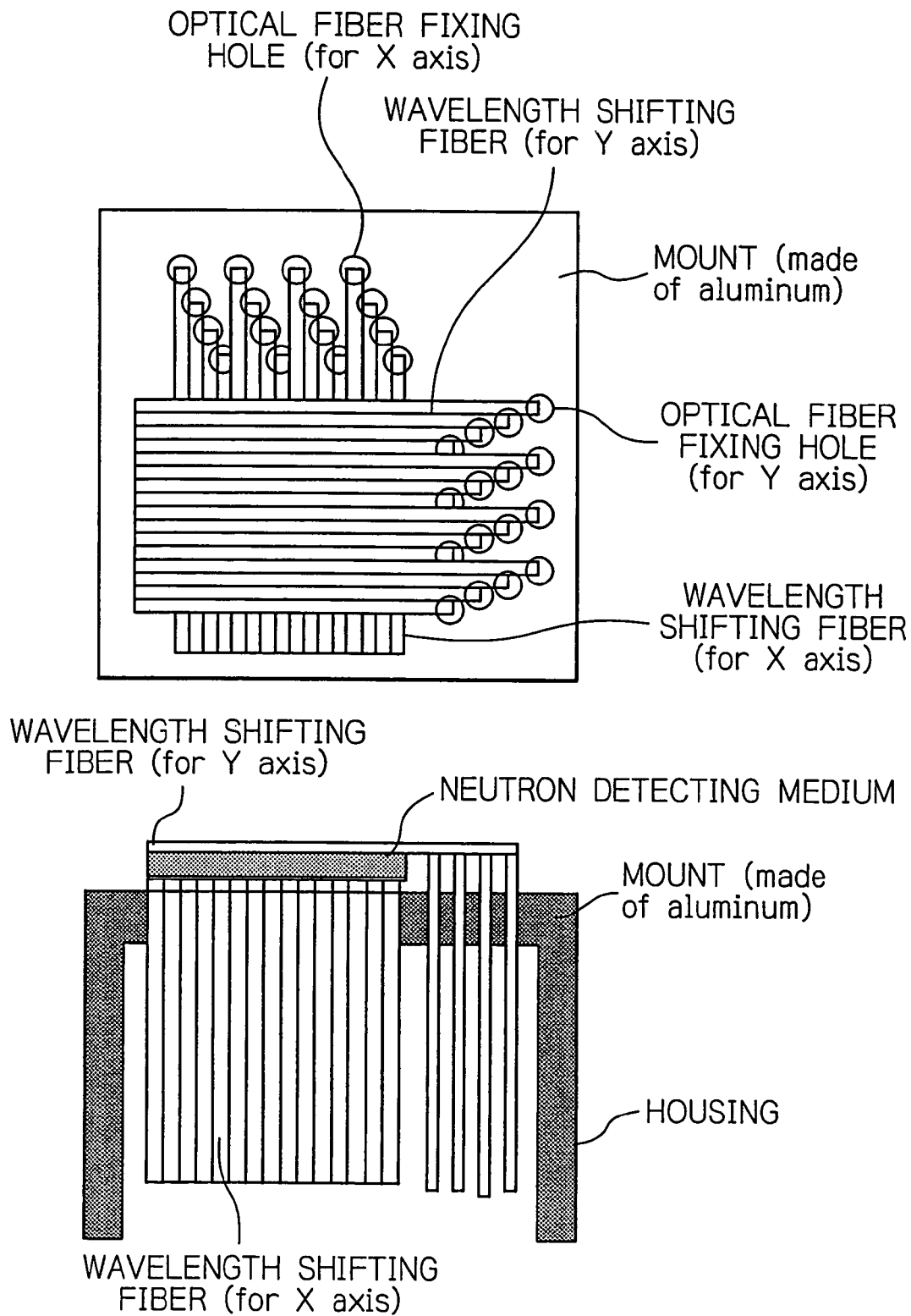
FIG. 14 shows schematically a neutron image detector in which optical fibers as bent at 90 degrees are arranged at very close spacings in two arrays that are crossed three-dimensionally.

A neutron image detector according to Example 11 of the invention is shown schematically in FIG. 14. At least two of the optical fibers described in Example 10 which were bent at an angle between 45 and 105 degrees were arranged at very close spacings in two arrays that were crossed three-dimensionally to realize the provision of two optical fiber bundles which could detect a neutron image.

The neutron detection medium was BC-702 (Bicron Co.) comprising a mixture of ZnS:Ag as a phosphor and $^6$LiF as a neutron converter, which was applied to Pyrex (registered trademark) glass in a thickness of 0.4 mm. The detection area was 8 mm×8 mm. The wavelength shifting fibers were those with a square cross section having a length of 0.5 mm on each side and 16 of them were used for each of the X- and Y-axes. In Example 11, there was applied the conventional crossed fiber method in which imaging was performed with a neutron detection medium sandwiched between an array of wavelength shifting fibers for X-axis and an array of wavelength shifting fibers for Y-axis. The wavelength shifting fibers for X- and Y-axes were BCF-92 (Bicron Co.) which had sensitivity to fluorescence at wavelengths ranging from 350 nm to 440 nm and which were capable of wavelength conversion to fluorescence at 490 nm. This fiber having a square cross section 0.5 mm long on each side was chosen since the phosphor sheet was 0.2 mm thick. The fiber bending angle was 90 degrees.

The wavelength shifting fibers were fixed on an aluminum mount by being passed through 0.8 mm$^\Phi$ holes that were spaced apart by 1 mm in four staggered rows as shown in FIG. 14. In determining the spacing of the holes, the length of one lateral side of the fiber was multiplied by 1.42 and the precision in boring was allowed for. In this way, the square wavelength shifting fibers having a length of 0.5 mm on each side could be arranged parallel at very close spacings. By using the wavelength shifting fibers as bent at 90 degrees, a very compact detector could be fabricated. The design of Example 11 is particularly effective in the case of using more than 100 fibers.

Figure 15:
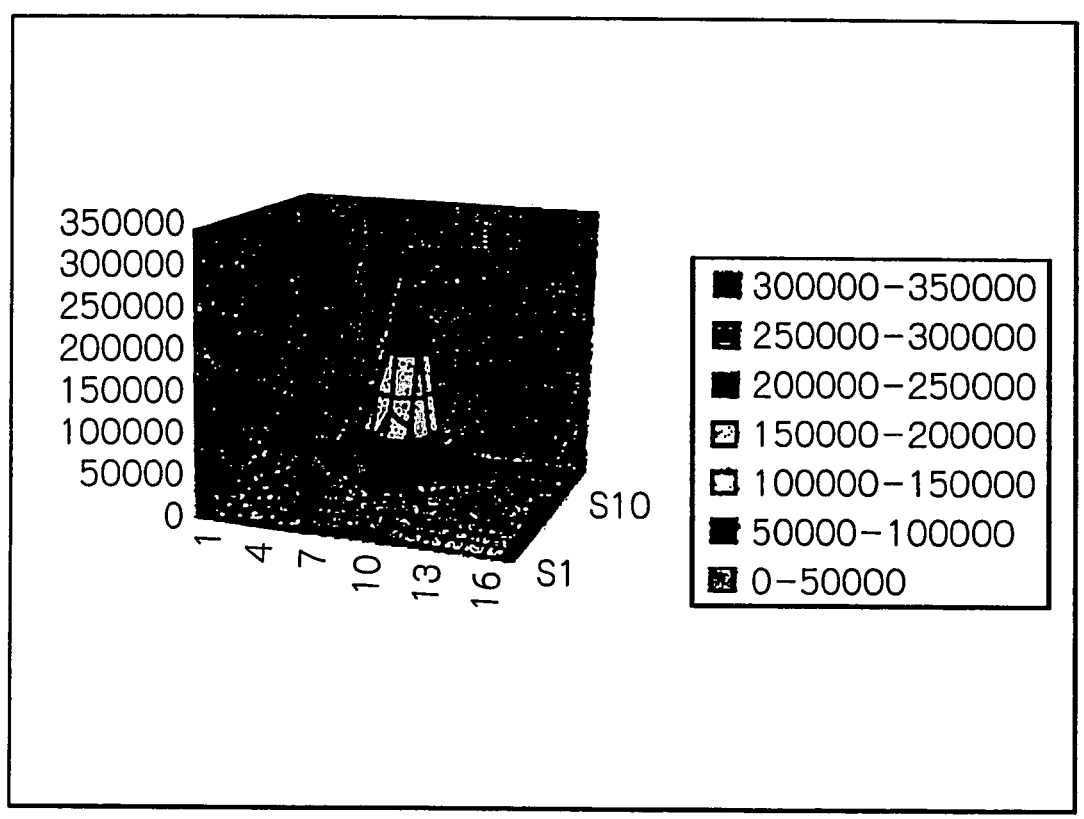
FIG. 15 shows data as obtained by measuring a 1.5 mm$^\phi$ cold neutron beam with the neutron image detector in which optical fibers as bent at 90 degrees are arranged at very close spacings in two arrays that are crossed three-dimensionally.

Using the neutron image detector of Example 11, 1.5 mm$^\Phi$ cold neutron beams were measured in the cold neutron radiographic facility (CNRF) in JRR-3M, a nuclear reactor of JAERI. The results of the measurements are shown in FIG. 15, from which one can see that the position resolving power of the detector was 0.6 mm, verifying the effectiveness of the concept of Example 11.

Example 12

When the fluorescence from a scintillator or phosphor which are a medium for radiation or neutron detection is to be detected with wavelength shifting fibers, the wavelength shifting fibers themselves work as a gamma-ray detector, so if they are unduly long, the gamma-ray background becomes significant and, at the same time, the transmittance of fluorescence subjected to wavelength shifting is reduced. The concept of Example 12 is used to solve these problems. In addition, the portion of the system which detects fluorescence using the wavelength shifting fibers or the lateral side light detecting optical fibers is separated from the portion where the detected fluorescence is guided to the photo detector and this contributes to easy maintenance.

Figure 16:
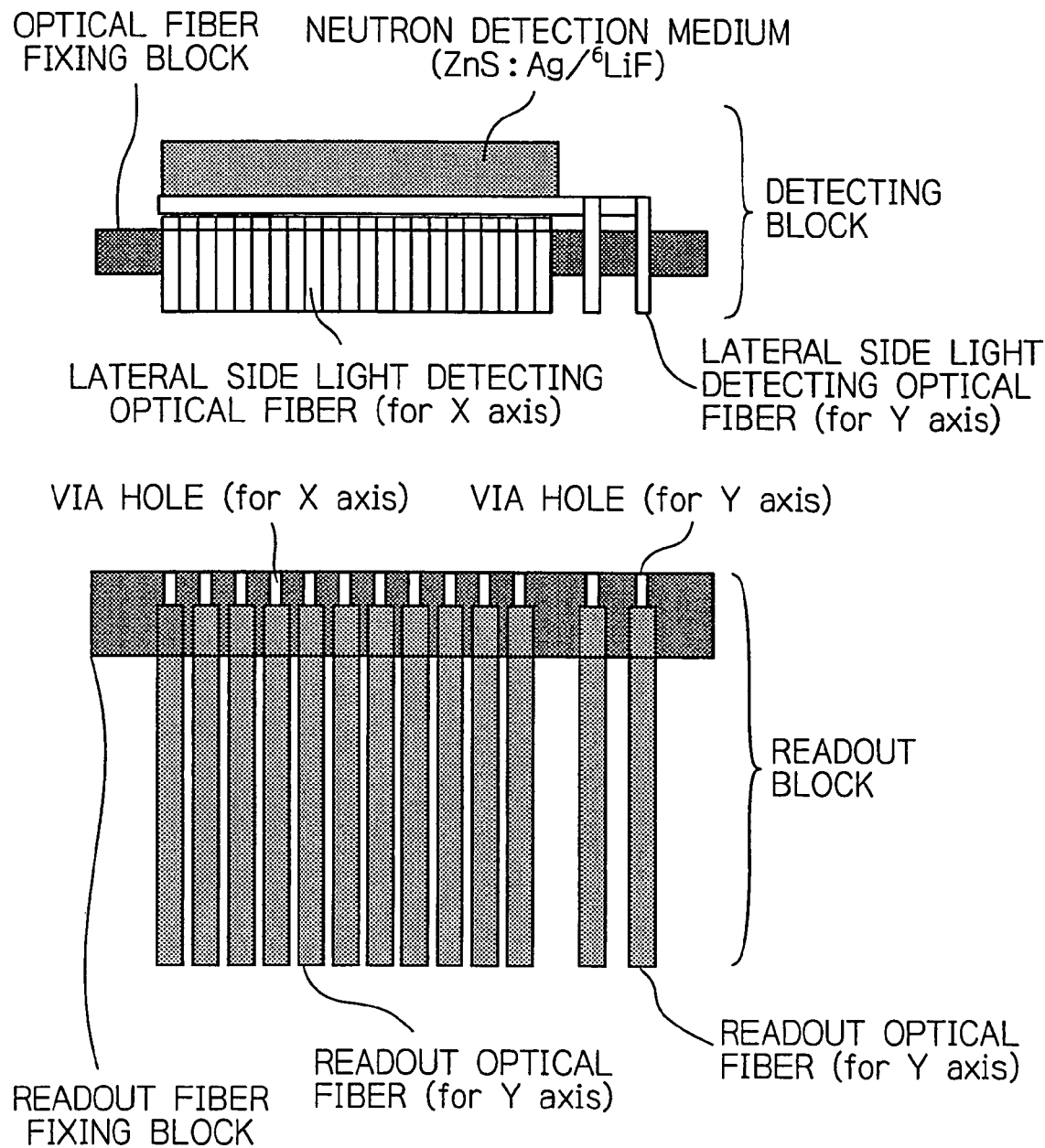
FIG. 16 shows schematically a neutron image detector using a detection block as separated from a readout block.
Figure 17:
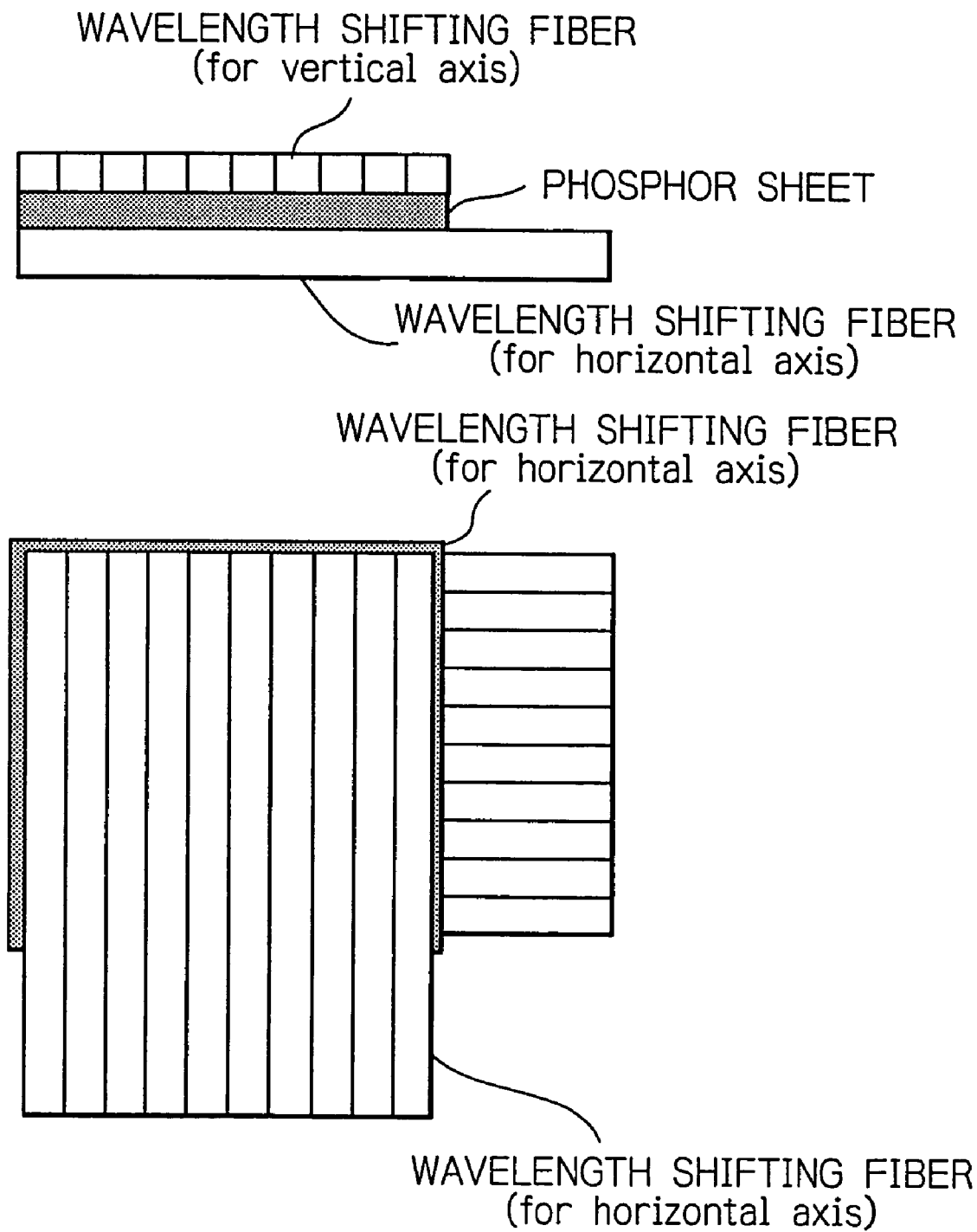
FIG. 17 is a diagram showing the principle of the conventional crossed fiber method in which a phosphor sheet or a scintillator plate is sandwiched between wavelength shifting fiber bundles placed in crossed planes at right angles and the incident position of radiation is determined by a coincidence counting technique to detect a radiation image.
Figure 18:
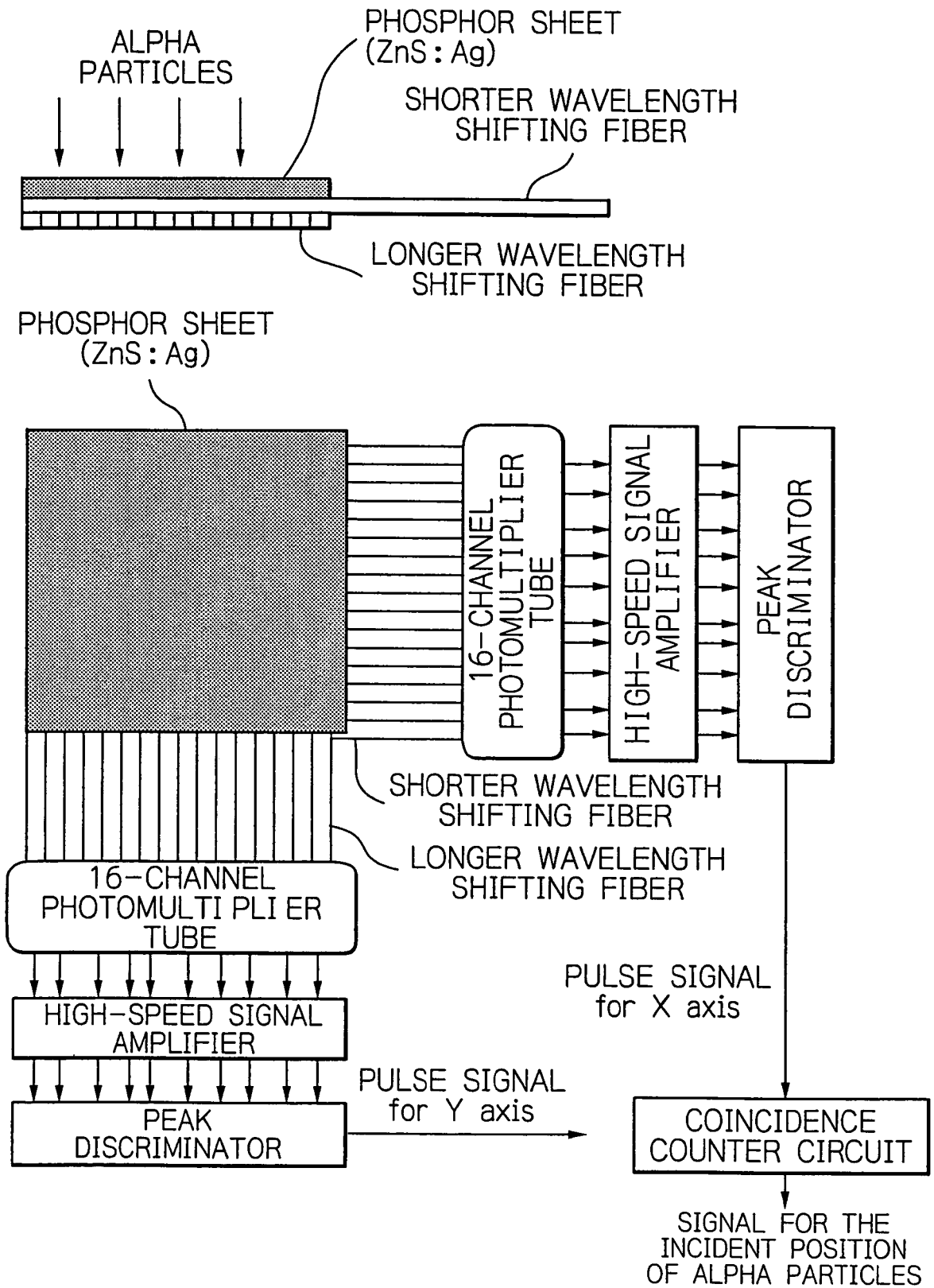
FIG. 18 is a diagram showing the principle of the conventional back readout method in which two wavelength shifting fiber bundles, one for detecting shorter wavelengths of fluorescence and one for detecting longer wavelengths of fluorescence, are placed in crossed planes at right angles and overlaid with a fluorescence sheet or a scintillator plate.

The concept of Example 12 is shown schematically in FIG. 16. It relates to a neutron image detector.

The neutron detection medium was 0.4-mm thick BC-702 (Bicron Co.) comprising ZnS:Ag as a phosphor and $^6$LiF as a neutron converter. As shown in FIG. 16, this neutron detection medium was underlaid with two bundles of parallel arranged lateral side light detecting fibers that were crossed at right angles; each bundle consisted of clear optical fibers that each had one of the four lateral sides scrapped off to provide a detecting portion.

The lateral side light detecting optical fibers were prepared from BCF-98, a clear fiber of Bicron Co. This fiber having a square cross section 0.5 mm long on each side was chosen since the phosphor sheet was 0.2 mm thick. The clear fibers in the two rectangular optical fiber bundles were adjusted to be identical in length as shown and had their end faces polished. The block carrying these fibers served as a detecting block.

The lateral side light detecting optical fibers were individually connected to clear circular optical fibers, which were connected at the other end to the photo detector. The block carrying these circular optical fibers served as a readout block. As shown, the readout block was in the form of a readout fiber fixing block through which via holes were made to establish connection for X- and Y-axes. The positions of via holes were in registry with the positions of the lateral side light detecting optical fibers for X- and Y-axes extending through the detecting block and the hole diameter was adjusted to be slightly larger than the optical fiber size. If the optical fibers in the detecting block are circular, clear optical fibers whose diameter is 1-1.5 times the diameter of the detecting optical fibers are used as readout optical fibers; if the optical fibers in the detecting block are square wavelength shifting fibers as in Example 12, clear circular optical fibers whose diameter is 1.42-2 times the length of each side of the square cross section of the detecting optical fibers are used as readout optical fibers and via holes are made through the readout block in such a size that clear circular optical fibers whose diameter is 1.42-2 times the length of each side of the square cross section of the detecting optical fibers can be fixed in those via holes. Within such holes, the readout optical fibers for X- and Y-axes are fixed. In Example 12, square fibers which are 0.5 mm long on each side of the square cross section are used for detection purposes, so ESCA or the 1 mm$^\Phi$ optical fiber of Mitsubishi Rayon Co., Ltd. can be used as readout optical fiber.

One advantage of separating the detecting block from the readout block is ease with which one can fabricate an image detector using a large number of optical fibers. Another advantage is easy maintenance.

Example 13

This example refers to the case of applying grease to the surfaces at which the wavelength shifting fibers or lateral side light detecting optical fibers of the type described in Example 12 were connected to clear circular optical fibers.

Transmittance measurement was conducted for two cases, one in which the wavelength shifting fibers or lateral side light detecting optical fibers were directly connected to the clear circular optical fibers and one in which grease was applied to the mating surfaces. The wavelength shifting fibers used were BCF-99 (Bicron Co.) or square fiber having a length of 0.5 mm on each side of the square cross section. The circular clear fiber was ESCA or the 1 mm$^\Phi$ plastic fiber of Mitsubishi Rayon Co., Ltd. As it turned out, a transmittance of 35% was observed when the two kinds of fiber were connected directly; however, when OKEN 6262A or optical grease of OHYO KOKEN KOGYO CO., LTD. was applied to the mating surfaces, the transmittance improved to 85%, verifying substantial absence of loss.

What is claimed is:

1. A two-dimensional radiation or neutron image detector which detects radiation or neutron comprising:

a scintillator or phosphor as a detection medium and a wavelength shifting fiber as a constituent material, wherein the scintillator or phosphor as the detection medium is underlaid with a parallel array of wavelength shifting fibers having sensitivity to the fluorescence emitted from either detection medium and which can absorb the fluorescence with an efficiency of no more than 50%, said parallel array of the wavelength sifting fibers being backed with a parallel array of lateral side light detecting optical fibers such that the two parallel arrays of fibers are crossed at right angles, wherein position pulse signals for horizontal and vertical axes as obtained from the two parallel arrays of fibers are subjected to coincidence counting to determine two-dimensional incident position of radiation or neutron detected, and wherein the lateral side light detecting optical fibers have a square cross section with a length of 0.25 mm to 2 mm on each side such that one of the four lateral sides is scrapped off by a thickness of 20 µm to 50 µm over a length ranging from 1 cm to 20 cm, with a material capable of random reflection of light being provided on the lateral side of each optical fiber which is opposite to the scrapped side, the lateral side light detecting optical fibers being used to detect the fluorescence from the detection medium, thereby detecting radiation or neutron.

2. The radiation or neutron image detector according to claim 1, wherein the material capable of random reflection of light that is provided on the lateral side of each optical fiber which is opposite the scrapped side is a radiation or neutron detection medium that uses a scintillator or a phosphor powder so that fluorescence is detected from both the scrapped lateral side and the backside in order to increase the efficiency of radiation or neutron detection.

3. The radiation or neutron image detector according to claim 1, wherein both ends of the lateral side light detecting optical fiber having one of the four lateral sides of the clear optical fiber scrapped off in a selected area are connected to a photo detector and the fluorescence from the detection medium is detected, thereby detecting radiation or neutron.

* * * * *